July 22, 1952  J. E. TOM  2,603,932
LAWN MOWER
Filed April 19, 1947

INVENTOR.
JOHN E. TOM
BY
Bates, Peare & McBean
ATTORNEYS

Patented July 22, 1952

2,603,932

UNITED STATES PATENT OFFICE 2,603,932

LAWN MOWER

John E. Tom, East Cleveland, Ohio, assignor to Earl Realty Company, Cleveland, Ohio, a corporation of Ohio Application April 19, 1947, Serial No. 742,610

5 Claims. (Cl. 56—26)

This invention relates to garden implements and particularly to lawn mowers.

Where lawn mowers are used on long grass especially where the mower is attached to a power driven tractor and where the mower is mounted in front of the tractor, the mower has a tendency to rise and slide over the grass instead of cutting it. This is particularly noticeable where obstacles, such as trees, require the mower to be turned quickly in the course of its travel.

An object of the present invention is to utilize an arrangement by means of which a weighted member may be carried by the mower and disposed forwardly and above the rotating cutting element so as to increase the force tending to hold the cutter in close proximity to the ground, without in any way affecting the maneuverability of the mower when used either as a hand operated machine or as a tractor operated machine.

Figure 1:
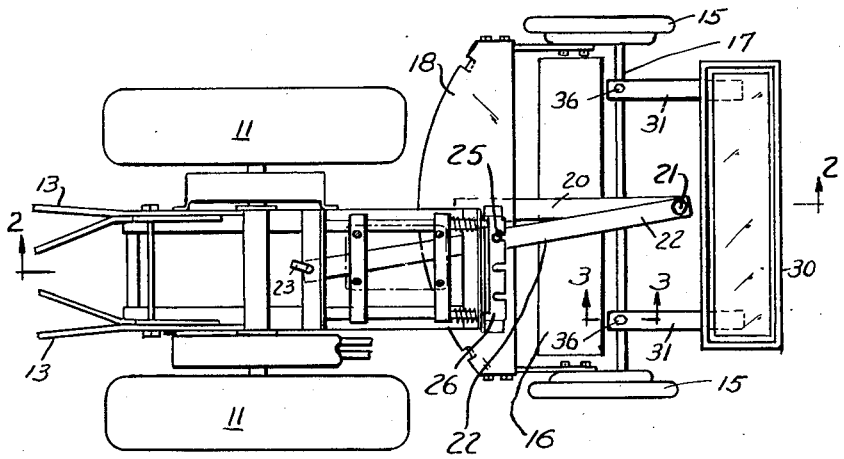
Figure 3:
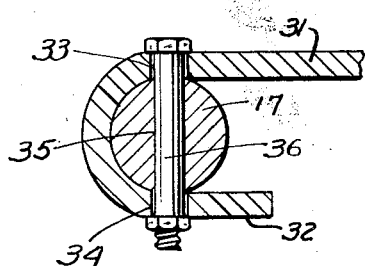
Figure 2:
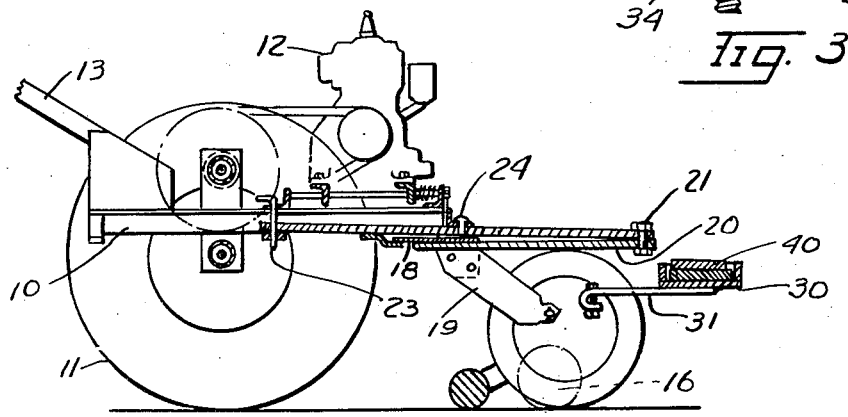
Figure 4:
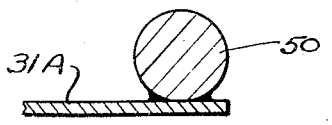

Referring now to the drawings, Fig. 1 is a top plan view of a portion of a power actuated tractor having a lawn mower attached thereto and having the present invention embodied therein; Fig. 2 is a vertical section taken on a plane indicated by the line 2—2 in Fig. 1; Fig. 3 is a section taken on a plane indicated by the line 3—3 in Fig. 1, but on a scale larger than that shown in Fig. 1, and Fig. 4 is a view on a larger scale than Figs. 1 and 2 showing in vertical section a modification of the weighted member of this invention.

The present invention is shown in connection with a wheeled power driven tractor which has a frame 10, traction wheels 11, a source of power indicated in general at 12 for actuating the wheels, and frame extensions 13 that terminate in handles by means of which the tractor may be guided. A lawn mower is shown as being disposed forwardly of the tractor frame and as having traction wheels 15, a rotatable cutting element 16 and a cross bar 17. The mower may be attached to the tractor by means of a plate 18 fastened to arms 19 that project upwardly from the mower, and the plate in turn carries a bar 20, the forward end of which is pivotally connected at 21 to a bar 22. The bar 22 may be detachably connected to the tractor frame by means of a pin 23 adjacent the rearward end of the bar, and by means of a second pin 24 disposed adjacent the mid-portion of the bar. The pin 24 is adapted to occupy a slot 25 in a bar 26 which comprises one of the end members of the tractor frame.

The foregoing assembly is such that the lawn mower is detachably connected to the tractor frame and is pulled forwardly by the bar 22 through the pivotal connection 21. The mower is thus free to turn about the pivot 21 in accordance with any turning motion imparted to the traction frame by the operator.

The cutting element has a tendency to slide over the grass whenever the grass is relatively long instead of remaining in close proximity to the ground. To overcome such tendency, I provide a weighted member that is carried by the mower forwardly of the cutting element and above the upper portion thereof, and I further provide for detachably connecting such weighted member to the mower so as to permit use thereof whenever required.

The preferred arrangement comprises a tray 30 which is rigidly attached, as by welding, to arms 31 that extend laterally thereof. Each arm preferably terminates in a hook-shaped portion 32 and is provided with openings 33 and 34 which are adapted to register with opening 35 in the bar 17. Bolts 36 are adapted to be passed through the registering openings for attaching the respective arms to the bar. One or more weights 40 may be positioned within the tray depending upon the length of the grass to be cut and I have found that for grass having the length of six inches, a weight of sixteen pounds is satisfactory.

An advantage of the present invention is the fact that the weighted member may be quickly attached whenever desired to the mower and that it will operate satisfactorily to retain the cutting element of the mower in close proximity to the ground. If desired, a single weighted member 50 (Fig. 4) may be rigidly attached to the forwardly projecting arms (here designated 31A) in place of the tray, but the tray possesses the advantage of enabling the weight to be increased whenever desired.

I claim:

1. A lawn mower having rearwardly extending propelling means and a pair of traction wheels, a rotating cutting element, a bar extending between the wheels, said bar having spaced openings therein, a weighted member, a pair of arms adapted to support said member forwardly of the bar and cutting element, each arm having a hook-shaped portion extending around the bar and having openings in registration with respective openings in the bar, and bolts extending through the openings for detachably positioning the arms to the bar.

2. The combination of a wheeled frame, a lawnmower having a frame including a substantially horizontal plate at the rear of the cutter, a bar extending forwardly from said plate, a swingable bar extending forwardly from the wheeled frame and pivotally connected to the first mentioned bar, means for guiding the plate as it swings transversely of said pivoted bar by the turning of the lawnmower, and a weight carried by the lawnmower out of range of said swinging bar.

3. The combination of a wheeled frame, a lawn mower disposed forwardly thereof and having a pair of traction wheels and a rotating cutting element therebetween, a member detachably connected to said frame for adjustment in a horizontal plane transverse to the driving axis and having one end freely extending forwardly therefrom, means pivotally connecting said mower forwardly of the frame and rearwardly of the free extended end of said member on a vertical axis through said free extended end, a bar extending between the mower wheels, and a weighted member detachably connected to said bar and projecting forwardly of said pivotal mower connection and said bar.

4. The combination of a lawn mower having its own frame, a pair of spaced wheels mounted in said frame, a rotating cutting element carried between the wheels and a transverse bar carried by the frame, wheeled propelling means behind the lawn mower carrying a coupling member having an end freely extending forwardly therefrom above and beyond said mower, means pivotally connecting said mower frame forwardly of the propelling means and rearwardly of the free extended end of said coupling member by a vertical axis through said free extended end, a pair of arms spaced apart and rigidly secured at their ends to said transverse bar and extending forwardly therefrom beyond the pivotal mower frame connection to the free extended end of said coupling member, and a transverse tray rigidly mounted on said arms adjacent their forward ends and adapted to carry a variable weight.

5. In combination with a wheeled propelling frame and a wheeled mower frame adapted to be coupled thereto, a coupling member having one end adjustably connected to said wheeled propelling frame for adjustment in a horizontal plane transverse to the driving axis and having its other end freely extending forwardly therefrom, means pivotally connecting said wheeled mower frame forwardly of said wheeled propelling frame and rearwardly of the free extended end of the coupling member by a vertical axis through said free extended end, a bar extending transversely between the mower wheels, and a weighted member detachably connected to said bar and projecting forwardly of said pivotal mower frame connection to the free extended end of said coupling member.

JOHN E. TOM.

REFERENCES CITED

The following references are of record in the file of this patent:

UNITED STATES PATENTS

| Number | Name | Date |
| --- | --- | --- |
| 884,258 | Baker | Apr. 7, 1908 |
| 993,986 | Hosmer | Sept. 14, 1909 |
| 1,189,168 | Parsons | June 27, 1916 |
| 1,351,939 | Andre | Sept. 7, 1920 |
| 1,704,333 | McClelland | Mar. 5, 1929 |
| 1,904,376 | Kruckmeyer | Apr. 18, 1933 |